United States Patent
Sugahara

(10) Patent No.: US 9,991,796 B2
(45) Date of Patent: Jun. 5, 2018

(54) SWITCH DRIVE CIRCUIT

(71) Applicant: FUJI ELECTRIC CO., LTD., Kawasaki-shi, Kanagawa (JP)

(72) Inventor: Satoshi Sugahara, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 190 days.

(21) Appl. No.: 15/219,690

(22) Filed: Jul. 26, 2016

(65) Prior Publication Data
US 2018/0034368 A1 Feb. 1, 2018

(51) Int. Cl.
H02J 1/10 (2006.01)
H02J 3/38 (2006.01)
H02M 3/158 (2006.01)

(52) U.S. Cl.
CPC .................................. H02M 3/158 (2013.01)

(58) Field of Classification Search
USPC ...................................................... 307/43, 52
See application file for complete search history.

(56) References Cited

U.S. PATENT DOCUMENTS

| | | | | |
|---|---|---|---|---|
| 9,837,161 | B2* | 12/2017 | Muller | G11C 16/28 |
| 9,859,739 | B2* | 1/2018 | Harrant | H02P 23/0004 |
| 2008/0129372 | A1* | 6/2008 | Rozsypal | H02M 3/07 |
| | | | | 327/536 |
| 2009/0052216 | A1* | 2/2009 | Iwabuchi | H02M 7/538 |
| | | | | 363/132 |
| 2009/0085542 | A1* | 4/2009 | Numano | H03K 17/0828 |
| | | | | 323/282 |
| 2010/0123511 | A1* | 5/2010 | Strzalkowski | H03K 17/6871 |
| | | | | 327/530 |
| 2012/0249099 | A1* | 10/2012 | Konecny | H03F 3/217 |
| | | | | 323/271 |
| 2013/0194006 | A1 | 8/2013 | Yamamoto | |
| 2014/0232311 | A1* | 8/2014 | Hill | H02P 6/186 |
| | | | | 318/400.33 |
| 2016/0079967 | A1* | 3/2016 | Miwa | H03K 17/063 |
| | | | | 327/109 |
| 2016/0109868 | A1* | 4/2016 | Harrant | H02J 7/0052 |
| | | | | 700/295 |
| 2016/0241189 | A1* | 8/2016 | Itasaka | H03B 5/362 |
| 2017/0012626 | A1* | 1/2017 | Dighrasker | H03K 17/08 |

(Continued)

FOREIGN PATENT DOCUMENTS

| | | |
|---|---|---|
| JP | 2004-040470 A | 2/2004 |
| JP | 2013-153388 A | 8/2013 |
| JP | 2014-060882 A | 4/2014 |

*Primary Examiner* — Adam Houston
(74) *Attorney, Agent, or Firm* — Rabin & Berdo, P.C.

(57) ABSTRACT

A switch drive circuit includes a high-side power supply section, a latch circuit, a high-side driver, a low-side driver, and a high-side switch control circuit. The latch circuit latches a logical level of a high-side switching signal at the time of performing switching of a high-side switch. The high-side driver drives the high-side switch by the high-side switching signal outputted from the latch circuit. The low-side driver drives a low-side switch by a low-side switching signal. The high-side switch control circuit sets, at the time of stopping the switching of the high-side switch, a stop established state in which the logical level of the high-side switching signal is fixed at a stop logic level, and releases the stop established state at the time of performing the switching of the high-side switch.

13 Claims, 11 Drawing Sheets

(56) References Cited

U.S. PATENT DOCUMENTS

| | | | |
|---|---|---|---|
| 2017/0093309 A1* | 3/2017 | Nishino | B25J 9/126 |
| 2017/0237362 A1* | 8/2017 | Sasaki | H02M 1/08 |
| | | | 363/98 |
| 2018/0019749 A1* | 1/2018 | Fesler | H03K 19/018507 |
| 2018/0034368 A1* | 2/2018 | Sugahara | H02M 3/158 |
| 2018/0076811 A1* | 3/2018 | Chan | H03K 17/6871 |

* cited by examiner

SWITCH DRIVE CIRCUIT

BACKGROUND OF THE INVENTION

1. Field of the Invention

Embodiments discussed herein relate to a switch drive circuit.

2. Background of the Related Art

In recent years the development of semiconductor devices incorporating a power semiconductor element, such as an insulated gate bipolar transistor (IGBT), a drive circuit which drives the power semiconductor element, and the like and called intelligent power modules (IPMs) has progressed.

IPMs are widely used in automotive electrical systems. Products which meet the demands of miniaturization, high performance, and high reliability are requested.

The following technique has been proposed. When a load is operated, an upper arm drive signal is put into an on state and an off state to generate a reset pulse to be transmitted to a flip-flop circuit which controls an upper arm power element. This prevents a short circuit from occurring between the upper arm power element and a lower arm power element (Japanese Laid-open Patent Publication No. 2014-60882).

In addition, the following technique has been proposed. Dead time is set independently for the transition of a high-side transistor to an on state and the transition of a low-side transistor to an on state. Even when noise is superimposed on a control signal, a high side control signal or a low side control signal is not outputted (Japanese Laid-open Patent Publication No. 2013-153388).

With IPMs a power semiconductor switch placed in a high side and a power semiconductor switch placed in a low side are turned on and off alternately to drive a load. In the high side, however, reference operating potential changes.

Furthermore, with some IPMs, a power semiconductor switch placed in a high side and a low-side diode which is placed in a low side and whose cathode is placed in the high-side switch side are included and a load is operated by performing switching of the high-side switch. That is to say, the load is driven by the switch. With these IPMs reference operating potential also changes in the high side.

Accordingly, conventionally there have been cases where a stop logic level of a stop signal transmitted from a control side may not be established in a high-side circuit at the time of stopping high-side switching. A logic of the stop signal may be inverted in a state in which a stop logic level cannot be established. As a result, a high-side switching element may not be turned off but be erroneously turned on.

SUMMARY OF THE INVENTION

According to an aspect, there is provided a switch drive circuit which operates a load by alternately performing switching of a high-side switch placed in a high side and a low-side switch placed in a low side, including a high-side power supply section which is a power supply for a high-side circuit, a latch circuit which receives power supplied from the high-side power supply section and which latches a logical level of a high-side switching signal at the time of performing switching of the high-side switch, a high-side driver which receives power supplied from the high-side power supply section and which drives the high-side switch by the high-side switching signal outputted from the latch circuit, a low-side driver which receives power supplied from a power supply for a low-side circuit and which drives the low-side switch by a low-side switching signal, and a high-side switch control circuit which sets, at the time of stopping the switching of the high-side switch, a stop established state in which the logical level of the high-side switching signal is fixed at a stop logic level needed for stopping the switching and which releases the stop established state at the time of performing the switching of the high-side switch, the high-side switch control circuit including a constant-current source which generates a reference current, a resistor, and a three-terminal switch, an input end of the constant-current source and a first input end of the three-terminal switch being connected to a first potential side of the high-side power supply section and one end of the resistor being connected to a second potential side of the high-side power supply section, another end of the resistor being connected to an output end of the constant-current source and a second input end of the three-terminal switch and an output end of the three-terminal switch being connected to an input end of the latch circuit, and the stop established state being set or released in the latch circuit by cutting off or passing the reference current and controlling switching of the three-terminal switch.

The object and advantages of the invention will be realized and attained by means of the elements and combinations particularly pointed out in the claims.

It is to be understood that both the foregoing general description and the following detailed description are provided by way of example and explanation and the invention is not limited to the examples provided.

DETAILED DESCRIPTION OF THE INVENTION

Embodiments will now be described with reference to the accompanying drawings. Repetitive descriptions of components in the specification and the drawings which have virtually the same functions may be omitted by marking them with the same numerals.

Figure 1A:
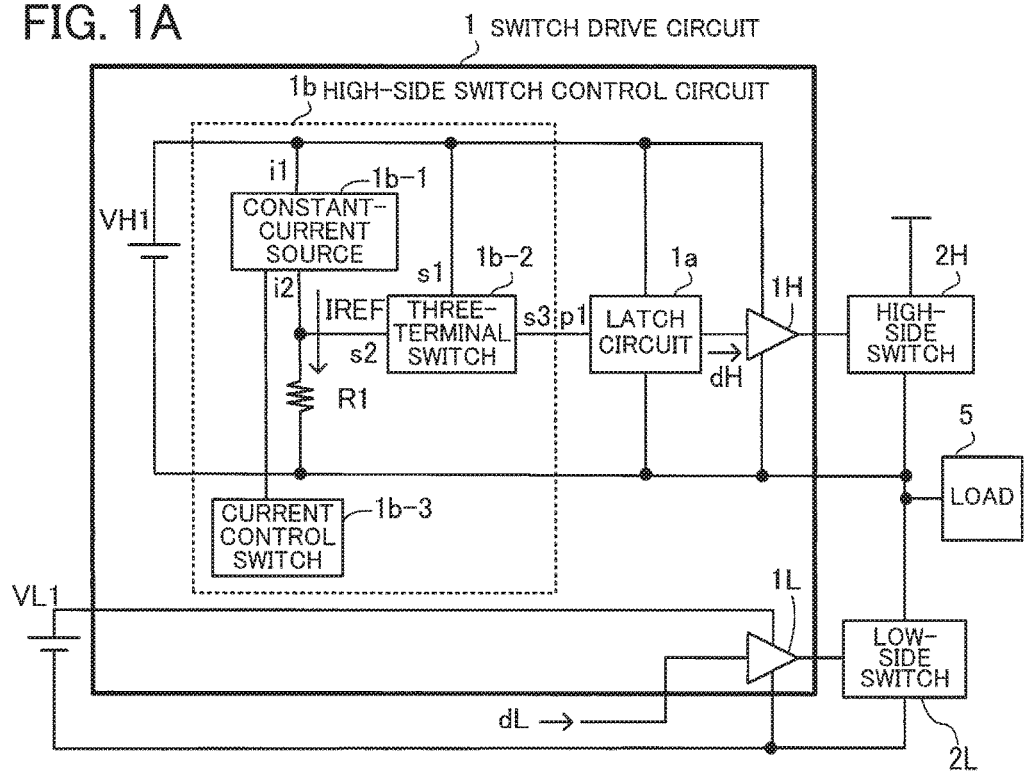
FIG. 1A illustrates an example of the structure of a switch drive circuit and FIG. 1B is a view for describing an example of the operation of the switch drive circuit.

FIG. 1A illustrates an example of the structure of a switch drive circuit. A switch drive circuit 1 drives a load 5 by alternately performing switching of a high-side switch 2H placed in a high side and a low-side switch 2L placed in a low side. In the present specification and claims, the switch drive circuit 1 together with the high-side switch 2H and the low-side switch 2L may be referred to generally as a switch circuit.

The switch drive circuit 1 includes a high-side power supply section VH1, a latch circuit 1a, a high-side driver 1H, a low-side driver 1L, and a high-side switch control circuit 1b.

The high-side power supply section VH1 is a power supply for a high-side circuit. The latch circuit 1a receives power supplied from the high-side power supply section VH1 and latches a logical level of a high-side switching signal dH at the time of performing switching of the high-side switch 2H.

The high-side driver 1H receives power supplied from the high-side power supply section VH1 and drives the high-side switch 2H by the high-side switching signal dH outputted from the latch circuit 1a.

The low-side driver 1L receives power supplied from a low-side power supply section VL1, which is a power supply for a low-side circuit, and drives the low-side switch 2L by a low-side switching signal dL transmitted from the outside.

The high-side switch control circuit 1b sets, at the time of stopping switching of the high-side switch 2H, a stop established state in which a logical level of the high-side switching signal dH is fixed at a stop logic level needed for stopping switching of the high-side switch 2H. Furthermore, the high-side switch control circuit 1b releases the stop established state at the time of performing switching of the high-side switch 2H.

The high-side switch control circuit 1b includes a constant-current source 1b-1 which generates a reference current IREF, a resistor R1, a three-terminal switch 1b-2, and a current control switch 1b-3. A first potential side (high potential side, for example) of the high-side power supply section VH1 is connected to an input end i1 of the constant-current source 1b-1 and a first input end s1 of the three-terminal switch 1b-2.

A second potential side (low potential side, for example) of the high-side power supply section VH1 is connected to one end of the resistor R1. Furthermore, the other end of the resistor R1 is connected to an output end i2 of the constant-current source 1b-1 and a second input end s2 of the three-terminal switch 1b-2. An output end s3 of the three-terminal switch 1b-2 is connected to an input end p1 of the latch circuit 1a.

The high-side switch control circuit 1b cuts off or passes the reference current IREF and controls switching of the three-terminal switch 1b-2. By doing so, the high-side switch control circuit 1b sets or releases a stop established state in the latch circuit 1a.

The current control switch 1b-3 controls switching between passing and cutting off the reference current IREF outputted from the constant-current source 1b-1.

Figure 1B:
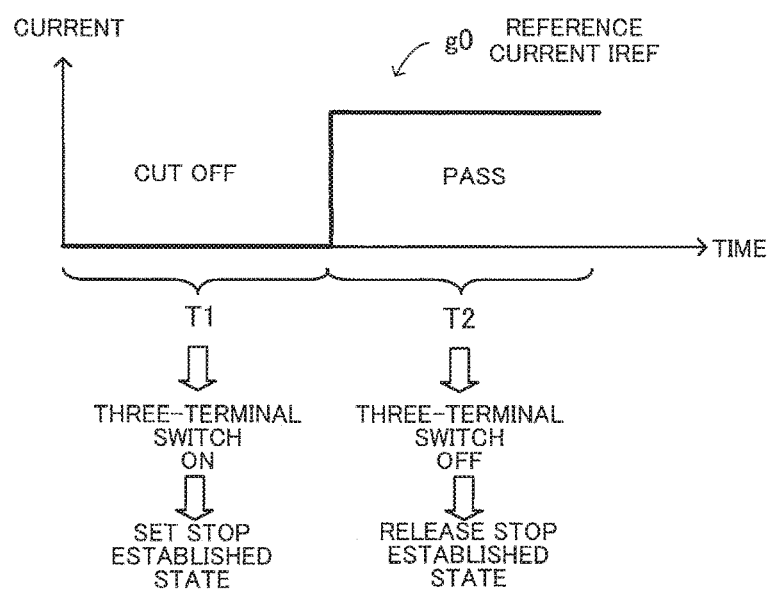

FIG. 1B is a view for describing an example of the operation of the switch drive circuit 1. FIG. 1B illustrates the relationships among cutting off or passing the reference current IREF, turning on or off the three-terminal switch 1b-2, and setting or releasing a stop established state in the latch circuit 1a. A graph g0 indicates the waveform of the reference current IREF. The vertical axis indicates current and the horizontal axis indicates time.

The reference current IREF is cut off during a period T1. At this time a potential of the second input end s2 of the three-terminal switch 1b-2 is equal via the resistor R1 to the second potential of the high-side power supply section VH1 and the three-terminal switch 1b-2 turns on. As a result, a potential of the input end p1 of the latch circuit 1a is fixed at a determined potential to set a stop established state.

Furthermore, the reference current IREF is passed during a period T2. At this time a potential of the second input end s2 of the three-terminal switch 1b-2 is equal to a value obtained by multiplying the reference current IREF and the resistance value of the resistor R1 together, and the three-terminal switch 1b-2 turns off. As a result, the stop established state set in the latch circuit 1a is released.

With the switch drive circuit 1, as has been described, the reference current IREF is cut off or passed and switching of the three-terminal switch 1b-2 is controlled. By doing so, a stop established state is set or released in the latch circuit 1a (detailed operation will be described later in FIGS. 5 through 11). The above structure prevents a high-side switching element from erroneously turning on.

Figure 2:
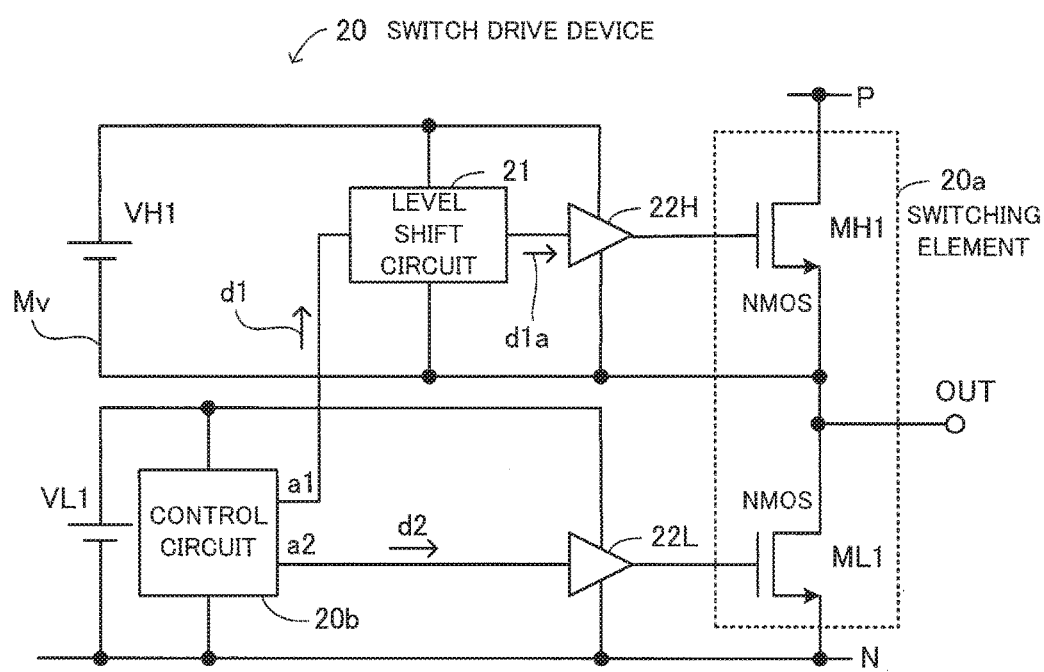
FIG. 2 illustrates an example of the structure of a switch drive device.

Next, the structure of and a problem with common switch drive devices will be described before the details of a technique according to the present disclosure are described. FIG. 2 illustrates an example of the structure of a switch drive device. An n-channel metal oxide semiconductor field effect transistor (MOSFET) is used as a high-side power semiconductor switch in a switch drive device 20.

The switch drive device 20 includes power supply sections VH1 and VL1, a level shift circuit 21, drivers 22H and 22L, a switching element 20a, and a control circuit 20b. The switching element 20a includes an NMOS transistor MH1, which is a high-side switch, and an NMOS transistor ML1, which is a low-side switch.

The circuit elements are connected in the following way. A high potential side potential P is connected to a drain of the NMOS transistor MH1. A high potential terminal of the power supply section VH1 is connected to a high potential side power supply terminal of the level shift circuit 21 and a high potential side power supply terminal of the driver 22H.

A low potential terminal of the power supply section VH1 is connected to a low potential side power supply terminal of the level shift circuit 21, a low potential side power supply terminal of the driver 22H, a source of the NMOS transistor MH1, an output terminal OUT, and a drain of the NMOS transistor ML1.

An input terminal of the level shift circuit 21 is connected to a terminal a1 of the control circuit 20b. An output terminal of the level shift circuit 21 is connected to an input terminal of the driver 22H. An output terminal of the driver 22H is connected to a gate of the NMOS transistor MH1.

Furthermore, a high potential terminal of the power supply section VL1 is connected to a high potential side power supply terminal of the control circuit 20b and a high potential side power supply terminal of the driver 22L. A low potential side potential N is connected to a low potential terminal of the power supply section VL1, a low potential side power supply terminal of the control circuit 20b, a low potential side power supply terminal of the driver 22L, and a source of the NMOS transistor ML1.

A terminal a2 of the control circuit 20b is connected to an input terminal of the driver 22L. An output terminal of the driver 22L is connected to a gate of the NMOS transistor ML1.

Figure 3:
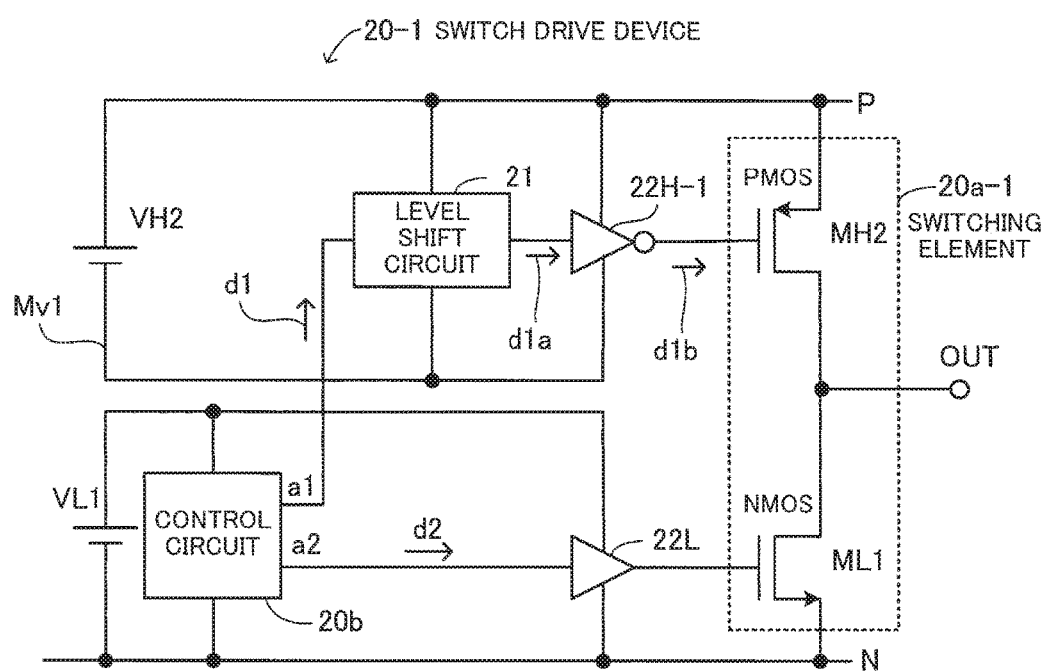
FIG. 3 illustrates an example of the structure of a switch drive device.

FIG. 3 illustrates an example of the structure of a switch drive device. A p-channel MOSFET is used as a high-side power semiconductor switch in a switch drive device 20-1.

The switch drive device 20-1 includes power supply sections VH2 and VL1, a level shift circuit 21, drivers 22H-1 and 22L, a switching element 20a-1, and a control circuit 20b. The switching element 20a-1 includes a PMOS transistor MH2 and an NMOS transistor ML1.

The circuit elements are connected in the following way. A high potential side potential P is connected to a source of the PMOS transistor MH2, a high potential terminal of the power supply section VH2, a high potential side power supply terminal of the level shift circuit 21, and a high potential side power supply terminal of the driver 22H-1.

A low potential terminal of the power supply section VH2 is connected to a low potential side power supply terminal of the level shift circuit 21 and a low potential side power supply terminal of the driver 22H-1.

An input terminal of the level shift circuit 21 is connected to a terminal a1 of the control circuit 20b. An output terminal of the level shift circuit 21 is connected to an input terminal of the driver 22H-1.

An output terminal of the driver 22H-1 is connected to a gate of the PMOS transistor MH2. A drain of the PMOS transistor MH2 is connected to a drain of the NMOS transistor ML1 and an output terminal OUT.

In addition, a high potential terminal of the power supply section VL1 is connected to a high potential side power supply terminal of the control circuit 20b and a high potential side power supply terminal of the driver 22L. A low potential side potential N is connected to a low potential terminal of the power supply section VL1, a low potential side power supply terminal of the control circuit 20b, a low potential side power supply terminal of the driver 22L, and a source of the NMOS transistor ML1.

A terminal a2 of the control circuit 20b is connected to an input terminal of the driver 22L. An output terminal of the driver 22L is connected to a gate of the NMOS transistor ML1.

Switching operation at load operation time will now be described. With the switch drive device 20 or 20-1 the control circuit 20b outputs from the terminal a1 a high-side switching signal d1 for performing switching of the NMOS transistor MH1 or the PMOS transistor MH2.

After the level shift circuit 21 level-shifts (boosts the voltage of) the high-side switching signal d1, the level shift circuit 21 performs a latch process and generates and outputs a high-side switching signal d1a.

The driver 22H of the switch drive device 20 inputs the high-side switching signal d1a after the latch process to the gate of the NMOS transistor MH1. On the other hand, the driver 22H-1 of the switch drive device 20-1 generates a high-side switching signal d1b by inverting a logic of the high-side switching signal d1a after the latch process, and inputs it to the gate of the PMOS transistor MH2.

With the switch drive device 20 or 20-1, on the other hand, the control circuit 20b outputs from the terminal a2 a low-side switching signal d2 for performing switching of the NMOS transistor ML1. The driver 22L inputs the low-side switching signal d2 to the gate of the NMOS transistor ML1.

With the switch drive device 20, it is assumed that the high-side switching signal d1a is at an H level and that the low-side switching signal d2 is at an L level. Then the NMOS transistor MH1 is in an on state and the NMOS transistor ML1 is in an off state.

Conversely, if the high-side switching signal d1a is at an L level and the low-side switching signal d2 is at an H level, then the NMOS transistor MH1 is in an off state and the NMOS transistor ML1 is in an on state.

With the switch drive device 20-1, on the other hand, it is assumed that the high-side switching signal d1b is at an L level and that the low-side switching signal d2 is at an L level. Then the PMOS transistor MH2 is in an on state and the NMOS transistor ML1 is in an off state.

Conversely, if the high-side switching signal d1b is at an H level and the low-side switching signal d2 is at an H level, then the PMOS transistor MH2 is in an off state and the NMOS transistor ML1 is in an on state.

The power supply section VH1 or VH2 which is a high-side power supply section of the switch drive device 20 or 20-1 will now be described. With the switch drive device 20 illustrated in FIG. 2, a reference potential of switching operation in the low side is the potential N. Even when the low-side NMOS transistor ML1 turns on or off, the potential N does not change.

With the switch drive device 20, on the other hand, a reference potential of switching operation in the high side is a potential Mv. When the high-side NMOS transistor MH1 turns on or off, the potential Mv changes.

That is to say, when the high-side NMOS transistor MH1 turns off and the low-side NMOS transistor ML1 turns on, the potential Mv falls to the potential N. Furthermore, when the high-side NMOS transistor MH1 turns on and the low-side NMOS transistor ML1 turns off, the potential Mv rises to the potential P.

Accordingly, a fixed power supply is not used in the high-side power supply section VH1 of the switch drive device 20. For example, a bootstrap circuit including a capacitor is used instead.

When the NMOS transistor MH1 turns off and the potential Mv falls to the potential N, the voltage of the low-side power supply section VL1 is applied in the bootstrap circuit to charge the capacitor.

When the NMOS transistor MH1 turns on and the potential Mv rises, voltage across the capacitor is applied to an element in the high-side circuit.

With the switch drive device 20-1 illustrated in FIG. 3, on the other hand, a reference potential of switching operation in the low side is the potential N. This is the same with the switch drive device 20. However, the PMOS transistor MH2 is used as a high-side switching element. Therefore, a reference potential of switching operation in the high side is the potential P.

If an output level of the driver 22H-1 is lowered with the potential P as reference, then the PMOS transistor MH2 turns on. Accordingly, a potential Mv1 indicated in FIG. 3 does not change.

As a result, a fixed power supply, such as a series regulator, is used in the high-side power supply section VH2 of the switch drive device 20-1. A fixed power supply is used in the low-side power supply section VL1 of the switch drive device 20 or 20-1.

A problem will now be described. If load operation is stopped in the switch drive device 20, a stop signal is transmitted from the control circuit 20b to the high side and the low side.

The low-side circuit receives power supplied from the power supply section VL1 which is a fixed power supply (control circuit 20b also receives power supplied from the power supply section VL1). Therefore, a logical level of the stop signal does not change and a stop logic is established by the stop signal transmitted from the control circuit 20b.

On the other hand, the high-side circuit receives power supplied from the power supply section VH1 which is a bootstrap power supply or the like. Accordingly, if a capacitor included in the power supply section VH1 is not charged sufficiently, the level shift circuit 21 or the driver 22-H is in an undefined state. When the level shift circuit 21 or the driver 22-H is in an undefined state, the logical level of the stop signal transmitted from the control circuit 20b is not established.

If the voltage of the power supply section VH1 drops and the high-side circuit is in an undefined state, a stop logic level is not established. As a result, the logical level of the stop signal may be inverted. In this state, the high-side switching element may be erroneously turned on.

The switch drive devices which drive loads by alternately performing switching of the high-side switches placed in the high sides and the low-side switches placed in the low sides have been described. Some of switch drive devices of this kind include diodes in place of low-side switches placed in low sides.

Figure 4:
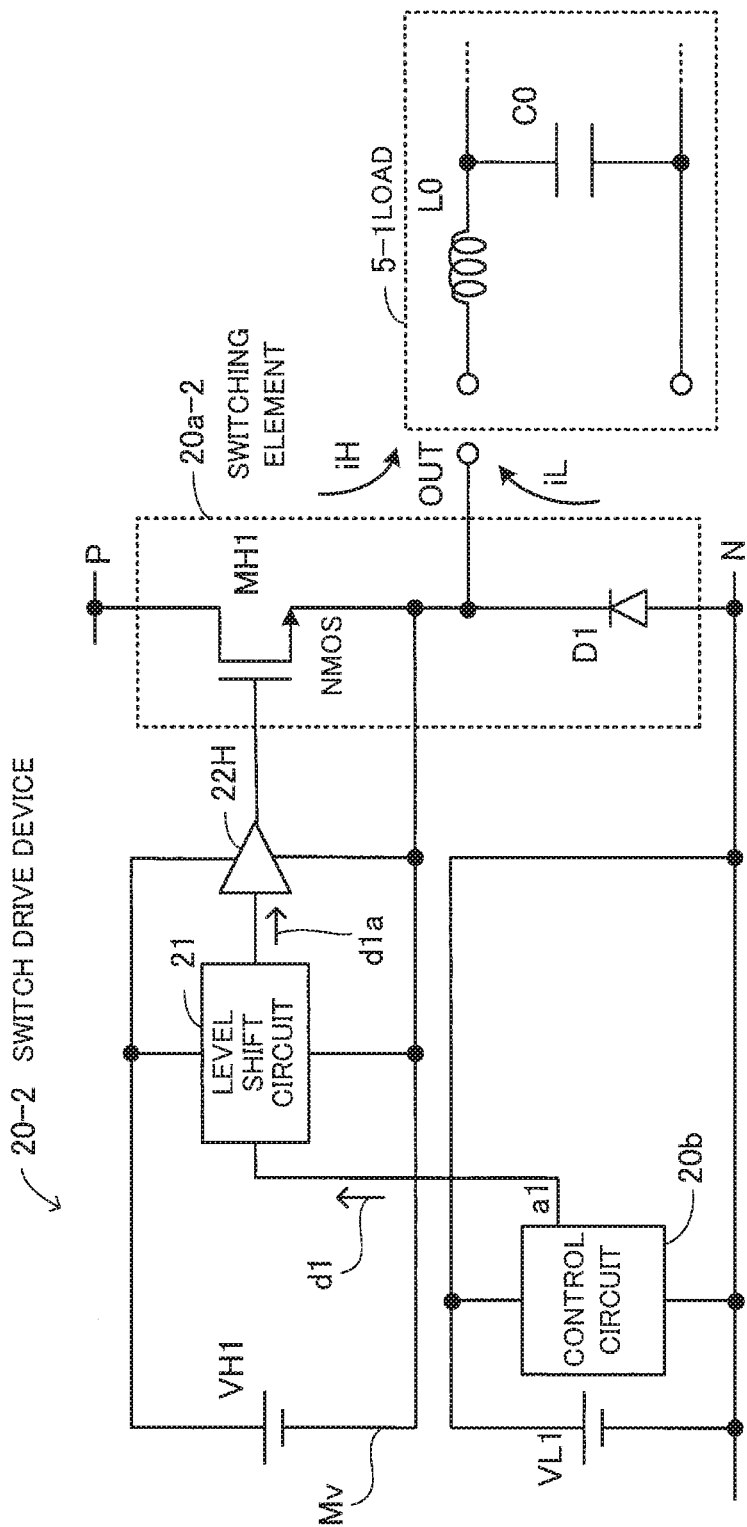
FIG. 4 illustrates an example of the structure of a switch drive device.

A device illustrated in FIG. 4 is taken as an example. The device illustrated in FIG. 4 is realized in the following way. In the switch drive device 20 illustrated in FIG. 2, the NMOS transistor ML1 is replaced with a diode D1 and the circuit corresponding to a gate signal of the NMOS transistor ML1 is removed. To be concrete, in a switching element 20a-2, a source of an NMOS transistor MH1 which is a high-side switch is connected to a cathode of the diode D1 and an anode of the diode D1 is connected to a potential N.

The device illustrated in FIG. 4 is applied to a circuit including an LC circuit with a coil L0 and a capacitor C0 as a load. A circuit including an LC circuit is exemplified by a load 5-1. In this case, a circuit including an LC circuit is, for example, a DC-DC converter. If a load is the load 5-1, current which flows through the load is as follows. As indicated by current iH and current iL, current flows from the NMOS transistor MH1 to the load and flows from the load to the diode D1. Accordingly, if a switch drive device is used for such a purpose, a diode may be placed in place of a switch in the low side of the switch drive device.

As is described with the switch drive devices which drive loads by alternately performing switching of the high-side switches placed in the high sides and the low-side switches placed in the low sides, a high-side switching element may be erroneously turned on even with the switch drive device illustrated in FIG. 4.

The switch drive device realized by replacing the low-side switch of the switch drive device illustrated in FIG. 2 with the diode has been described. However, the same structure may be adopted with the switch drive device 20-1 illustrated in FIG. 3. That is to say, in the switch drive device 20-1, the NMOS transistor ML1 is replaced with a diode D1 and the circuit corresponding to a gate signal of the NMOS transistor ML1 is removed. The description of the switch drive device 20-1 illustrated in FIG. 3 also applies to this switch drive device, with the exception that the low-side switch is replaced with the diode.

The present disclosure was made in view of the above problem. There are provided a switch drive circuit, a switch drive module, and a switch drive device which establish stop logic levels in high sides with accuracy, which prevent high-side switching elements from erroneously turning on, and whose quality is improved.

Figure 5:
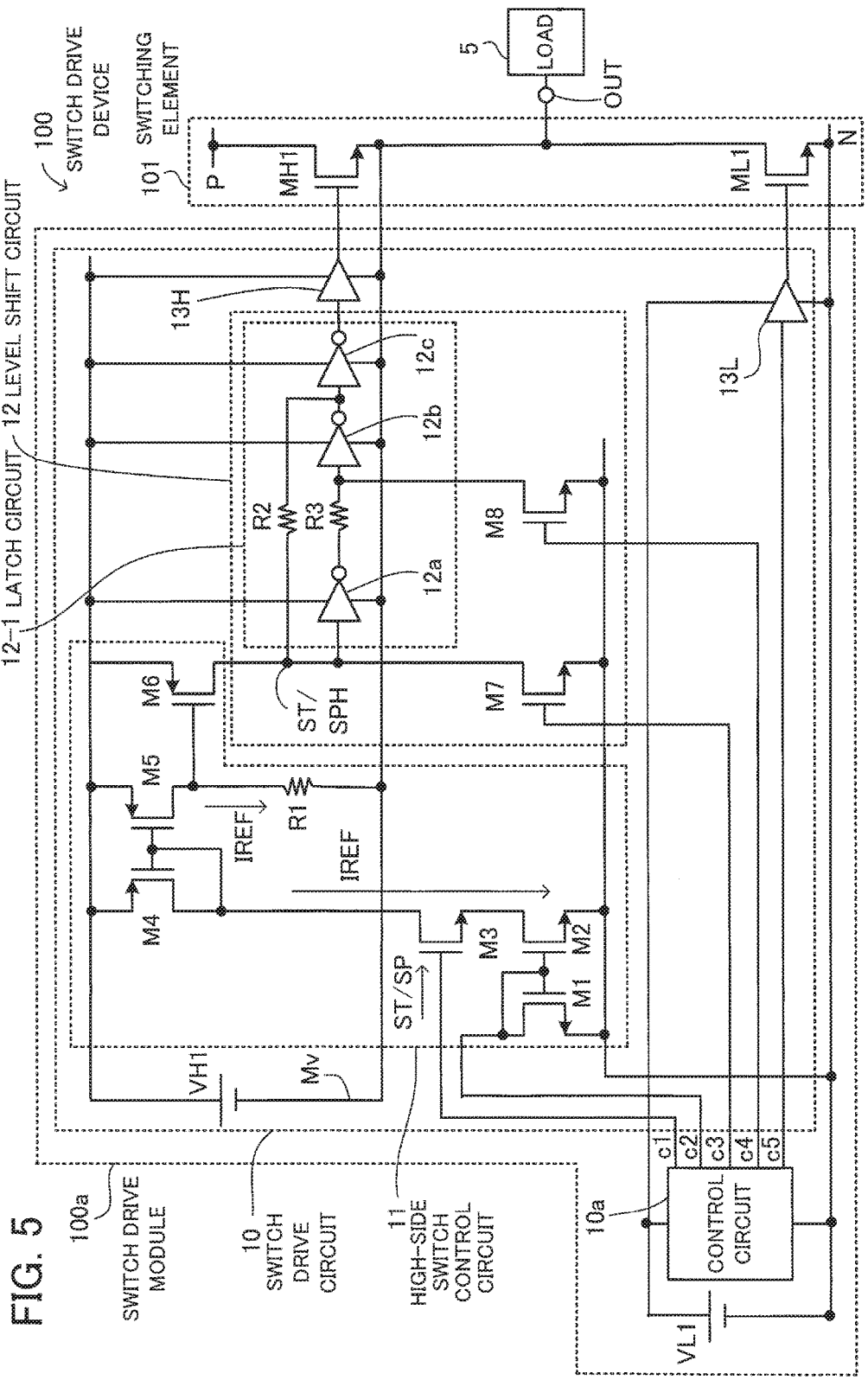
FIG. 5 illustrates an example of the structure of a switch drive device.

A switch drive device according to an embodiment will now be described in detail. FIG. 5 illustrates an example of the structure of a switch drive device. A switch drive device 100 includes a switch drive module 100a and a switching element 101.

The switching element 101 includes an NMOS transistor MH1, which is a high-side switch, and an NMOS transistor ML1, which is a low-side switch.

Furthermore, the switch drive module 100a includes a switch drive circuit 10, a control circuit 10a, and a power supply section VL1. In addition, the switch drive circuit 10 includes a high-side switch control circuit 11, a level shift circuit 12, drivers 13H and 13L, and a power supply unit VH1.

The high-side switch control circuit 11 includes NMOS transistors M1 through M3, PMOS transistors M4 (first PMOS transistor), M5 (second PMOS transistor), and M6 (third PMOS transistor), and a resistor R1.

The level shift circuit 12 includes NMOS transistors M7 and M8 and a latch circuit 12-1. The latch circuit 12-1 includes inverters 12a through 12c and resistors R2 and R3. The power supply section VL1 may be included in the switch drive circuit 10.

The correspondence between FIGS. 1A and 5 is as follows. The function of the constant-current source 1b-1 is realized by a current mirror circuit made up of the PMOS transistors M4 and M5. The three-terminal switch 1b-2 is realized by the PMOS transistor M6. In addition, the current control switch 1b-3 is realized by the NMOS transistor M3. Furthermore, the latch circuit 1a is realized by the latch circuit 12-1.

The circuit elements are connected in the following way. A high potential side potential P is connected to a drain of the NMOS transistor MH1. A high potential terminal of the power supply unit VH1 is connected to sources of the PMOS transistors M4 through M6, high potential side power supply terminals of the inverters 12a through 12c, and a high potential side power supply terminal of the driver 13H.

A low potential terminal of the power supply unit VH1 is connected to one end of the resistor R1, low potential side power supply terminals of the inverters 12a through 12c, a low potential side power supply terminal of the driver 13H, a source of the NMOS transistor MH1, an output terminal OUT, and a drain of the NMOS transistor ML1. The output terminal OUT is connected to a load 5.

A gate of the PMOS transistor M4 is connected to a drain of the PMOS transistor M4, a gate of the PMOS transistor M5, and a drain of the NMOS transistor M3. A drain of the PMOS transistor M5 is connected to a gate of the PMOS transistor M6 and the other end of the resistor R1. A drain of the PMOS transistor M6 is connected to one end of a resistor R2, an input terminal of the inverter 12a, and a drain of the NMOS transistor M7.

An output terminal of the inverter 12a is connected to one end of a resistor R3. The other end of the resistor R3 is connected to an input terminal of the inverter 12b and a drain of the NMOS transistor M8.

The other end of the resistor R2 is connected to an output terminal of the inverter 12b and an input terminal of the inverter 12c. An output terminal of the inverter 12c is connected to an input terminal of the driver 13H. An output terminal of the driver 13H is connected to a gate of the NMOS transistor MH1.

Furthermore, a high potential terminal of the power supply section VL1 is connected to a high potential side power supply terminal of the control circuit 10a and a high potential side power supply terminal of the driver 13L. A low potential side potential N is connected to a low potential terminal of the power supply section VL1, a low potential side power supply terminal of the control circuit 10a, sources of the NMOS transistors M1, M2, M7, and M8, a low potential side power supply terminal of the driver 13L, and a source of the NMOS transistor ML1.

A terminal c1 of the control circuit 10a is connected to a gate of the NMOS transistor M3. A source of the NMOS transistor M3 is connected to a drain of the NMOS transistor M2. A terminal c2 of the control circuit 10a is connected to a drain of the NMOS transistor M1 and gates of the NMOS transistors M1 and M2.

A terminal c3 of the control circuit 10a is connected to a gate of the NMOS transistor M7. A terminal c4 of the control circuit 10a is connected to a gate of the NMOS transistor M8. A terminal c5 of the control circuit 10a is connected to an input terminal of the driver 13L. An output terminal of the driver 13L is connected to a gate of the NMOS transistor ML1.

The latch function of the level shift circuit 12 will now be described. The level shift circuit 12 includes the latch circuit 12-1 which latches (holds) a logical level of a high-side switching signal for controlling switching of the high-side switch.

Figure 6:
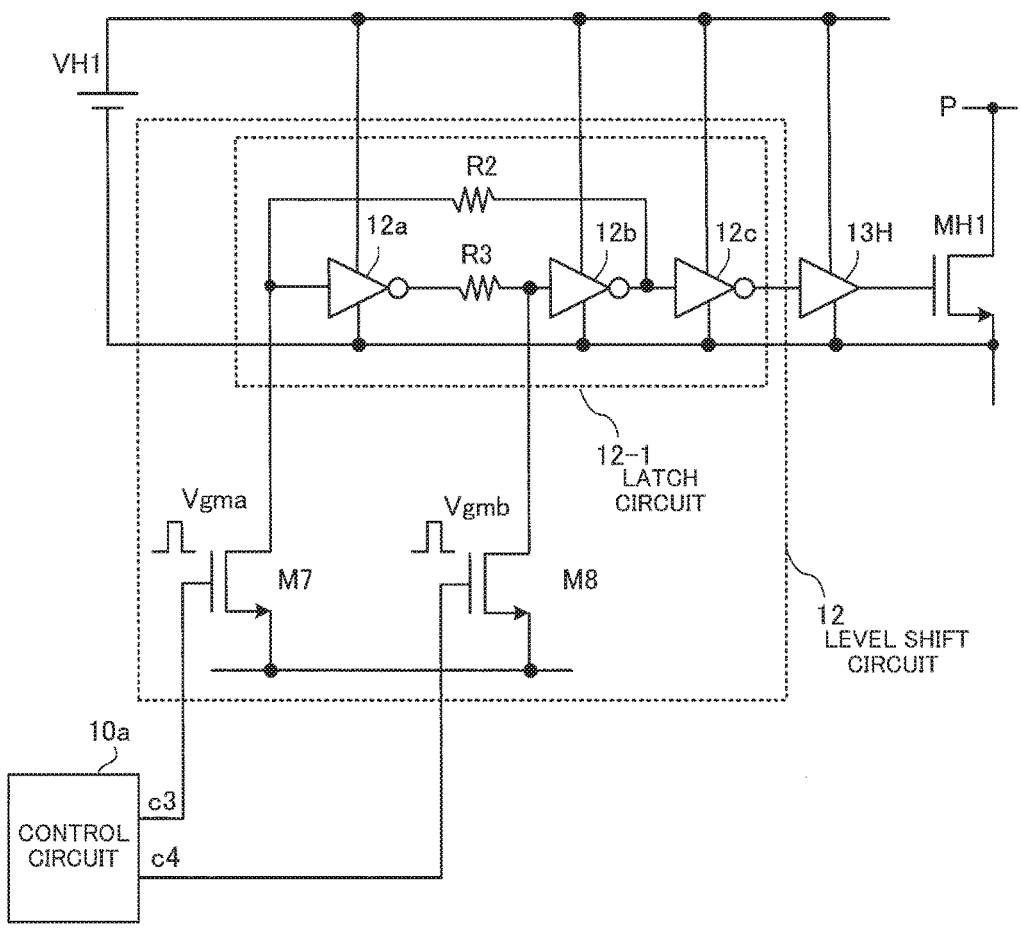
FIG. 6 illustrates a latch structure in a level shift circuit.

FIG. 6 illustrates a latch structure in the level shift circuit. FIG. 6 illustrates the circuit structure of the latch circuit 12-1 of the level shift circuit 12 and its surroundings illustrated in FIG. 5.

The latch circuit 12-1 includes inverters 12a (first inverter), 12b (second inverter), and 12c (third inverter) and resistors R2 (first resistor) and R3 (second resistor). Inverters which realize a latch function are the inverters 12a and 12b. However, the inverter 12c used for inverting an output level is also included in the latch circuit 12-1.

In addition, each of the NMOS transistors M7 and M8 is a latched logic rewriting switch for rewriting a logical level of an output from the latch circuit 12-1.

Latch operation will be described. A pulse signal for designating turning on or off of the high-side NMOS transistor MH1 is outputted from the terminal c3 or c4 of the control circuit 10a.

In order to make an output of the driver 13H an H level, a pulse signal Vgma is outputted from the terminal c3 of the control circuit 10a. At this time the NMOS transistor M7 turns on.

As a result, in the latch circuit 12-1, an input of the inverter 12a becomes an L level, an output of the inverter 12a becomes an H level, and an output of the inverter 12b becomes an L level.

Because an L-level signal is latched, an output of the inverter 12c at the last stage becomes an H level and an H-level high-side switching signal is outputted from the driver 13H.

On the other hand, in order to make an output of the driver 13H an L level, a pulse signal Vgmb is outputted from the terminal c4 of the control circuit 10a. At this time the NMOS transistor M8 turns on.

As a result, in the latch circuit 12-1, an input of the inverter 12b becomes an L level and an output of the inverter 12b becomes an H level.

Because an H-level signal is latched, an output of the inverter 12c at the last stage becomes an L level and an L-level high-side switching signal is outputted from the driver 13H.

By turning on the NMOS transistors M7 and M8 alternately in this way by the use of the pulse signals Vgma and Vgmb respectively, a logic of an output level of the latch circuit 12-1 is rewritten.

Figure 7:
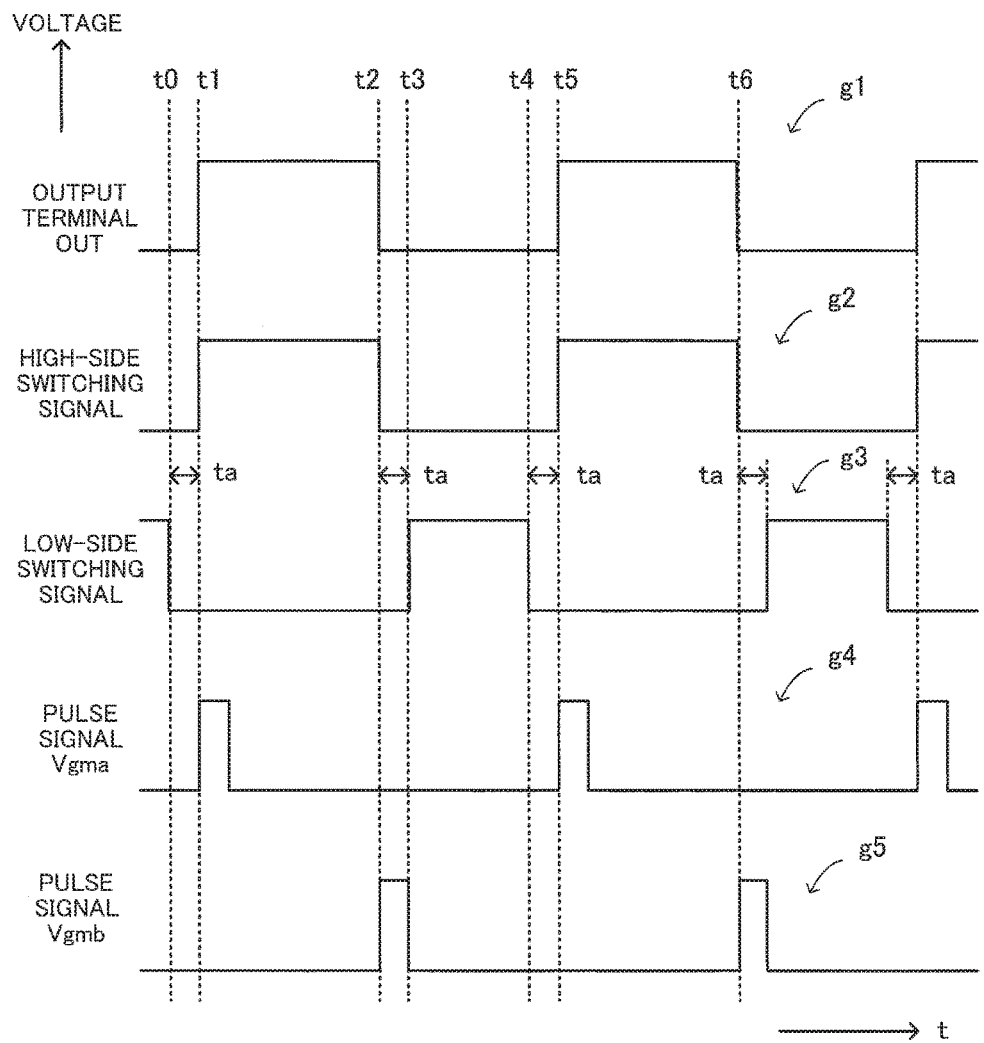
FIG. 7 illustrates switching waveforms at load operation time.

The switching operation of the switch drive device 100 at load operation time will now be described. FIG. 7 illustrates switching waveforms at load operation time. In FIG. 7, a vertical axis indicates voltage and a horizontal axis indicates time t.

A waveform g1 indicates a signal at the output terminal OUT. A waveform g2 indicates a high-side switching signal inputted to the gate of the NMOS transistor MH1. A waveform g3 indicates a low-side switching signal inputted to the gate of the NMOS transistor ML1. Furthermore, a waveform g4 indicates a pulse signal Vgma and a waveform g5 indicates a pulse signal Vgmb.

(t0<t<t1) The high-side switching signal, the low-side switching signal, the pulse signal Vgma, and the pulse signal Vgmb are at an L level.

When both of the high-side switching signal and the low-side switching signal are at the L level, both of the NMOS transistor MH1 and the NMOS transistor ML1 are in an off state. The signal at the output terminal OUT is at an L level.

When both of the high-side switching signal and the low-side switching signal become an H level and both of the NMOS transistor MH1 and the NMOS transistor ML1 turn on, through current may flow through the NMOS transistor MH1 and the NMOS transistor ML1.

Accordingly, both of the high-side switching signal and the low-side switching signal are made the L level for a constant time ta from the falling of the low-side switching signal to the rising of the high-side switching signal and for the constant time ta from the falling of the high-side switching signal to the rising of the low-side switching signal so that both of the NMOS transistor MH1 and the NMOS transistor ML1 are in an off state.

(t1≤t<t2) The pulse signal Vgma is outputted from the terminal c3 of the control circuit 10a. By doing so, the high-side switching signal is latched at the H level. Furthermore, the low-side switching signal at the L level is outputted from the terminal c5 of the control circuit 10a.

When the high-side switching signal is at the H level and the low-side switching signal is at the L level, the NMOS transistor MH1 is in an on state, the NMOS transistor ML1 is in an off state, and the signal at the output terminal OUT is at an H level.

The low-side switching signal for performing switching of the NMOS transistor ML1 is outputted from the terminal c5 of the control circuit 10a and is applied directly to the NMOS transistor ML1 via the driver 13L.

(t2≤t<t3) The pulse signal Vgmb is outputted from the terminal c4 of the control circuit 10a. By doing so, the high-side switching signal is latched at the L level. Furthermore, the low-side switching signal at the L level is outputted from the terminal c5 of the control circuit 10a. As a result, the signal at the output terminal OUT is at the L level.

(t3≤t<t4) The high-side switching signal is latched at the L level. Furthermore, the low-side switching signal at the H level is outputted from the terminal c5 of the control circuit 10a.

When the high-side switching signal is at the L level and the low-side switching signal is at the H level, the NMOS transistor MH1 is in an off state, the NMOS transistor ML1 is in an on state, and the signal at the output terminal OUT is at the L level.

(t4≤t<t5) The high-side switching signal is latched at the L level. Furthermore, the low-side switching signal at the L level is outputted from the terminal c5 of the control circuit 10a. As a result, the signal at the output terminal OUT is at the L level.

(t5≤t<t6) The pulse signal Vgma is outputted from the terminal c3 of the control circuit 10a. By doing so, the high-side switching signal is latched at the H level. Furthermore, the low-side switching signal at the L level is outputted from the terminal c5 of the control circuit 10a. As a result, the signal at the output terminal OUT is at the H level. After that, the same is repeated.

The operation of the high-side switch control circuit 11 will now be described by the use of FIGS. 5, 8, and 9. First the PMOS transistors M4 and M5 in the high-side switch control circuit 11 make up a current mirror circuit and generate reference current IREF as a source constant-current source. In addition, the NMOS transistors M1 and M2 in the high-side switch control circuit 11 make up a current mirror circuit and function as a sink current source for drawing in the reference current IREF.

The control circuit 10a outputs from the terminal c1 a start(ST)/stop(SP) signal for performing switching between passing and cutting off the reference current IREF by turning on or off the NMOS transistor M3.

Figure 8:
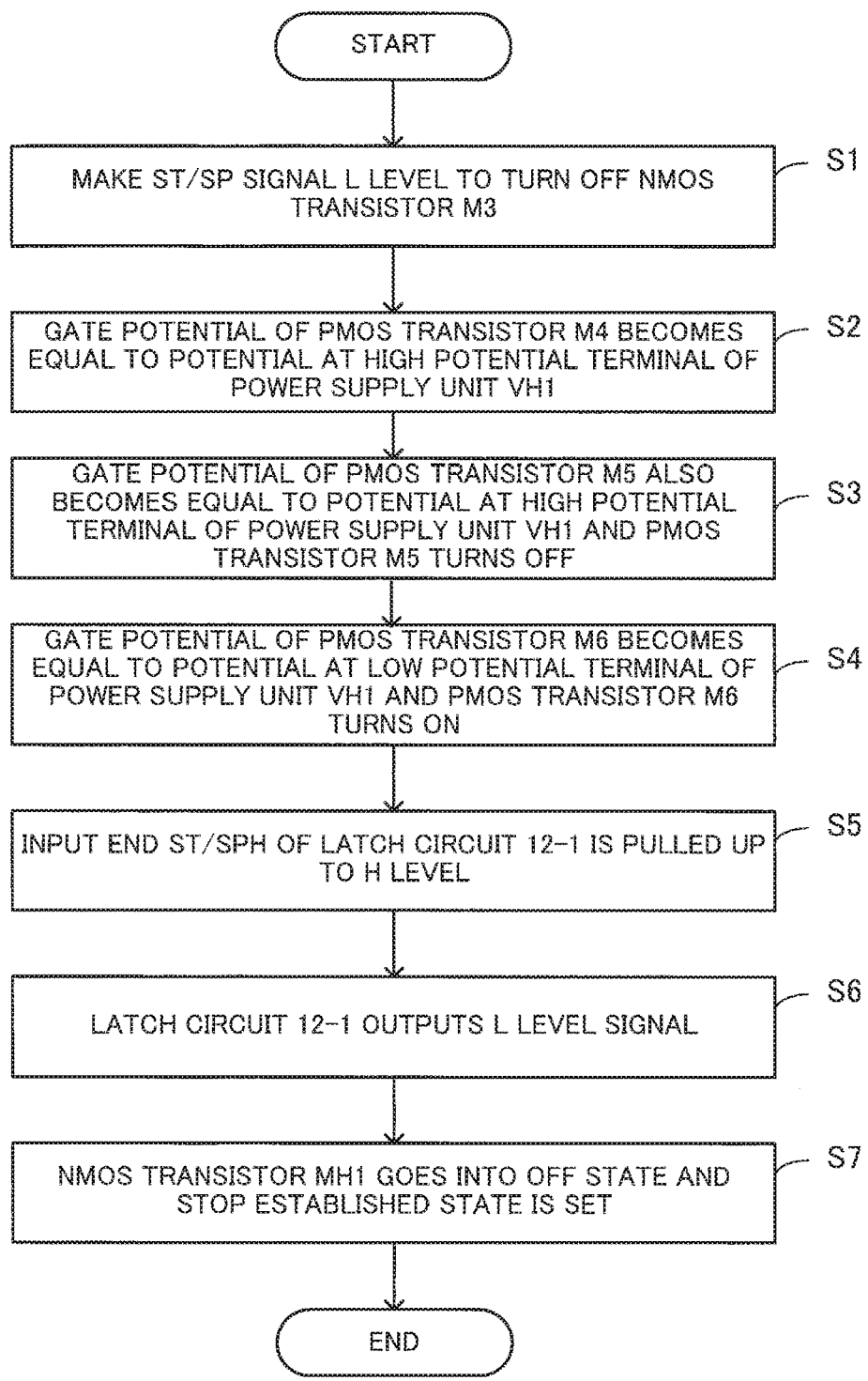
FIG. 8 illustrates the flow of operation at the time of stopping switching.

FIG. 8 illustrates the flow of operation at the time of stopping switching. The operation of fixing an output level of the latch circuit 12-1 (level of the high-side switching signal) at the L level is illustrated.

(S1) The control circuit 10a makes the ST/SP signal an L level to turn off the NMOS transistor M3.

(S2) When the NMOS transistor M3 is turned off, the reference current IREF does not flow (reference current IREF is cut off) and gate potential of the diode-connected PMOS transistor M4 (its drain and gate are connected) becomes equal to potential at the high potential terminal of the power supply unit VH1.

(S3) Gate potential of the PMOS transistor M5 also becomes equal to the potential at the high potential terminal of the power supply unit VH1. As a result, the PMOS transistor M5 turns off.

(S4) When the PMOS transistor M5 turns off, gate potential of the PMOS transistor M6 becomes equal via the resistor R1 to potential at the low potential terminal of the power supply unit VH1. As a result, the PMOS transistor M6 turns on.

(S5) When the PMOS transistor M6 turns on, a point ST/SPH (input end of the latch circuit 12-1) is pulled up and is fixed at an H level.

(S6) An input of the inverter 12a is at the H level, an output of the inverter 12b is at the H level, and an output of the inverter 12c is at an L level. Accordingly, an L-level signal is outputted from the latch circuit 12-1.

(S7) The L-level signal is applied via the driver 13H to the gate of the NMOS transistor MH1. Accordingly, the NMOS transistor MH1 goes into an off state regardless of a change in the potential (potential Mv) at the low potential terminal of the power supply unit VH1 and a stop established state is set.

Figure 9:
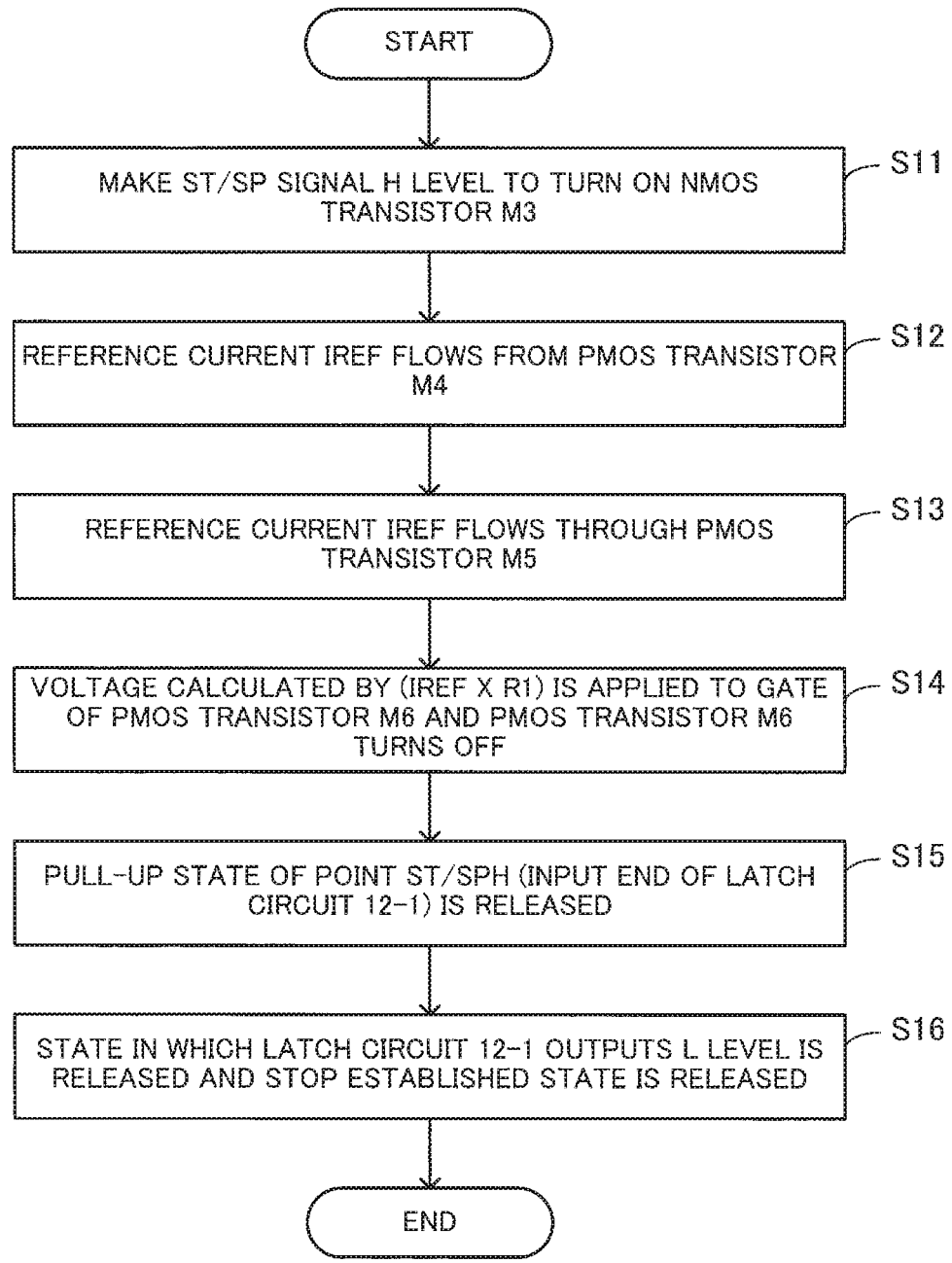
FIG. 9 illustrates the flow of operation at the time of performing switching.

FIG. 9 illustrates the flow of operation at the time of performing switching. The operation of releasing the state in which the latch circuit 12-1 outputs the L level is illustrated.

(S11) The control circuit 10a makes the ST/SP signal an H level to turn on the NMOS transistor M3.

(S12) When the NMOS transistor M3 is turned on, the reference current IREF flows from the PMOS transistor M4 (reference current IREF is passed). A high-potential on-signal is outputted from the terminal c2.

(S13) The PMOS transistors M4 and M5 make up a current mirror circuit. When the reference current IREF passes through the PMOS transistor M4, the reference current IREF also flows through the PMOS transistor M5.

(S14) Because the reference current IREF flows through the resistor R1, voltage calculated by multiplying the reference current IREF and the resistance value of the resistor R1 together (IREF×R1) is applied to the gate of the PMOS transistor M6 and the PMOS transistor M6 turns off.

(S15) When the PMOS transistor M6 turns off, the pull-up state of the point ST/SPH (input end of the latch circuit 12-1) is released.

(S16) The state in which the latch circuit 12-1 outputs the L level is released and the stop established state is released.

Figure 10:
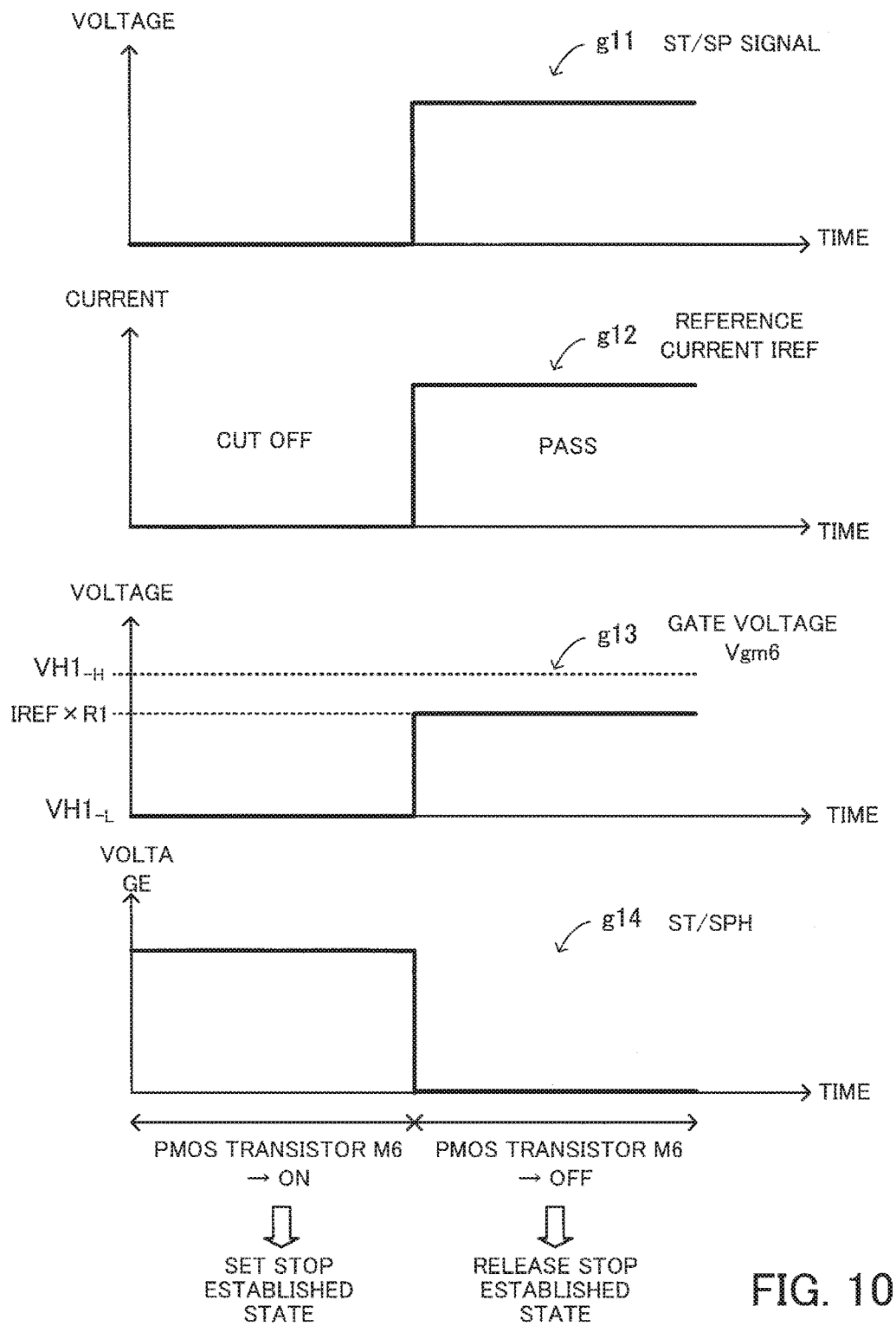
FIG. 10 illustrates operation waveforms of a high-side switch control circuit.

FIG. 10 illustrates operation waveforms of the high-side switch control circuit. A waveform g11 indicates the ST/SP signal. In this case, a vertical axis indicates voltage and a horizontal axis indicates time. A waveform g12 indicates the reference current IREF. In this case, a vertical axis indicates current and a horizontal axis indicates time.

A waveform g13 indicates gate voltage Vgm6 of the PMOS transistor M6. In this case, a vertical axis indicates voltage and a horizontal axis indicates time. VH$1_H$ indicates voltage at the high potential terminal of the power supply unit VH1 and VH$1_L$ indicates voltage at the low potential terminal of the power supply unit VH1. A waveform g14 indicates a level at the point ST/SPH. In this case, a vertical axis indicates voltage and a horizontal axis indicates time.

When the ST/SP signal is at an L level, the NMOS transistor M3 is in an off state. Therefore, the reference current IREF is cut off and the PMOS transistor M5 is in an off state. At this time voltage at the low potential terminal of the power supply unit VH1 is applied as the gate voltage Vgm6 of the PMOS transistor M6.

As a result, the PMOS transistor M6 is in an on state. The point ST/SPH is pulled up to an H level. Accordingly, a state in which the latch circuit 12-1 outputs an L level is maintained and a stop established state is set.

On the other hand, when the ST/SP signal is at an H level, NMOS transistor M3 is in an on state. Therefore, the reference current IREF is passed and the PMOS transistor M5 is in an on state. At this time voltage calculated by (IREF×R1) is applied as the gate voltage Vgm6 of the PMOS transistor M6.

As a result, the PMOS transistor M6 is in an off state. The pull-up state of the point ST/SPH is released and the state in which the latch circuit 12-1 outputs the L level is released. That is to say, the stop established state is released.

As has been described, according to the technique in the present disclosure, the PMOS transistor M6 is in an on state until the power supply unit VH1 stably starts. By doing so, an output of the latch circuit 12-1 remains a signal which forcedly turns off the high-side switch. This prevents the high-side switch from erroneously turning on.

In the foregoing the structure of the device which is an improvement on the switch drive device 20 illustrated in FIG. 2 has been described. However, the technique in the present disclosure is also applicable to the switch drive device 20-1 illustrated in FIG. 3.

Figure 11:
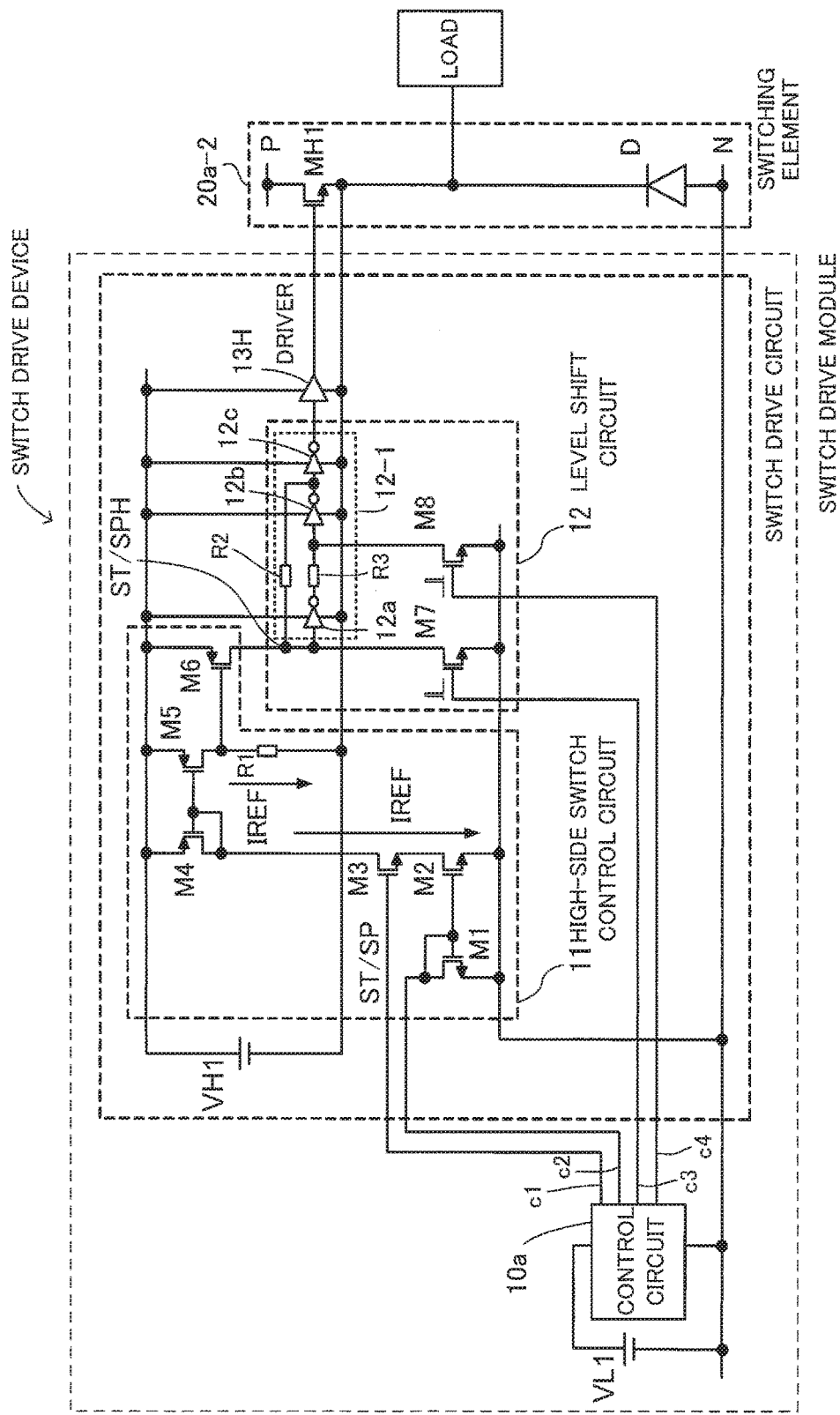
FIG. 11 illustrates an example of the structure of a switch drive device.

Furthermore, the technique in the present disclosure is also applicable to the switch drive device 20-2 illustrated in FIG. 4. A concrete example of a structure realized by applying the technique in the present disclosure to the switch drive device 20-2 is illustrated in FIG. 11. The above description given by the use of FIGS. 5 through 10 also applies to a device illustrated in FIG. 11.

With a device illustrated in FIG. 11, the NMOS transistor ML1 in FIG. 5 is replaced with a diode D and the circuit which drives the gate of the NMOS transistor ML1 in FIG. 5 is not included. It is desirable to pay attention to this. In addition, as described in FIG. 4, a circuit including an LC circuit is taken as an example of a load. Current which flows through the load is as follows. As indicated by the current iH and the current iL, current flows from an NMOS transistor MH1 to the load and flows from the load to the diode D. It is desirable to pay attention to this.

Furthermore, in the above description an example using MOS transistors is given. However, bipolar transistors may be used.

According to an aspect, establishing a logical level of a stop signal prevents a high-side switching element from erroneously turning on.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A switch drive circuit which operates a load by alternately performing switching of a high-side switch placed in a high side and a low-side switch placed in a low side, the switch drive circuit comprising:
   a high-side power supply section which is a power supply for a high-side circuit;
   a latch circuit which receives power supplied from the high-side power supply section and which latches a logical level of a high-side switching signal at the time of performing switching of the high-side switch;
   a high-side driver which receives power supplied from the high-side power supply section and which drives the high-side switch by the high-side switching signal outputted from the latch circuit;
   a low-side driver which receives power supplied from a power supply for a low-side circuit and which drives the low-side switch by a low-side switching signal; and
   a high-side switch control circuit which sets, at the time of stopping the switching of the high-side switch, a stop established state in which the logical level of the high-side switching signal is fixed at a stop logic level needed for stopping the switching and which releases the stop established state at the time of performing the switching of the high-side switch,
   wherein:
   the high-side switch control circuit includes a constant-current source which generates a reference current, a resistor, and a three-terminal switch;
   an input end of the constant-current source and a first input end of the three-terminal switch are connected to a first potential side of the high-side power supply section and one end of the resistor is connected to a second potential side of the high-side power supply section;
   another end of the resistor is connected to an output end of the constant-current source and a second input end of the three-terminal switch and an output end of the three-terminal switch is connected to an input end of the latch circuit; and
   the stop established state is set or released in the latch circuit by cutting off or passing the reference current and controlling switching of the three-terminal switch.

2. The switch drive circuit according to claim 1, wherein the high-side switch control circuit is configured to turn on the three-terminal switch, to fix a potential at the input end of the latch circuit at a determined potential, and to set the stop established state, by cutting off the reference current and making a potential at the second input end of the three-terminal switch equal to the second potential of the high-side power supply section, and
the high-side switch control circuit is configured to turn off the three-terminal switch and release the stop established state, by passing the reference current and making the potential at the second input end of the three-terminal switch a potential calculated by multiplying the reference current and a resistance value of the resistor together.

3. The switch drive circuit according to claim 1, wherein the high-side switch control circuit further includes a current control switch for performing switching between passing and cutting off the reference current outputted from the constant-current source.

4. The switch drive circuit according to claim 3, wherein:
   the constant-current source is a current mirror circuit including a first PMOS transistor and a second PMOS transistor, the three-terminal switch is a third PMOS transistor, and the current control switch is an NMOS transistor;
   the first potential side of the high-side power supply section is connected to sources of the first PMOS transistor, the second PMOS transistor, and the third PMOS transistor;
   a gate of the first PMOS transistor is connected to a drain of the first PMOS transistor, a gate of the second PMOS transistor, and a drain of the NMOS transistor; and
   a drain of the second PMOS transistor is connected to a gate of the third PMOS transistor and the other end of the resistor and a drain of the third PMOS transistor is connected to the input end of the latch circuit.

5. The switch drive circuit according to claim 4, wherein:
   the latch circuit includes a first inverter, a second inverter, a third inverter, a first resistor, and a second resistor;
   an input end of the first inverter is an input end of the latch circuit and is connected to the drain of the third PMOS transistor and one end of the first resistor;
   an output end of the first inverter is connected to one end of the second resistor and another end of the second resistor is connected to an input end of the second inverter; and
   another end of the first resistor is connected to an output end of the second inverter and an input end of the third inverter, and an output end of the third inverter is an output end of the latch circuit and is connected to an input end of the high-side driver.

6. The switch drive circuit according to claim 4, wherein:
   a designation signal for controlling passing or cutting off the reference current is inputted to a gate of the NMOS transistor which is the current control switch; and
   a sink current source for drawing in the reference current is connected to a source of the NMOS transistor.

7. A switch drive circuit having a high-side switch located in a high side of the switch drive circuit and a low-side diode which is in a low side of the switch drive circuit, the low-side diode having a cathode located in a high-side switch side, the switch drive circuit operating a load by performing switching of the high-side switch, the switch drive circuit comprising:
   a high-side power supply section which is a power supply for a high-side circuit;
   a latch circuit which receives power supplied from the high-side power supply section and which latches a logical level of a high-side switching signal at a time of performing switching of the high-side switch;

a high-side driver which receives power supplied from the high-side power supply section and which drives the high-side switch by the high-side switching signal outputted from the latch circuit; and a high-side switch control circuit configured to set, at a switching-stop time of the high-side switch, a stop established state in which a logical level of the high-side switching signal is fixed at a stop logic level needed for stopping the switching of the high-side switch, and configured to release the stop established state at the time of performing the switching of the high-side switch, wherein:

the high-side switch control circuit includes a constant-current source which generates a reference current, a resistor, and a three-terminal switch;

an input end of the constant-current source and a first input end of the three-terminal switch are connected to a first potential side of the high-side power supply section and one end of the resistor is connected to a second potential side of the high-side power supply section;

another end of the resistor is connected to an output end of the constant-current source and a second input end of the three-terminal switch and an output end of the three-terminal switch is connected to an input end of the latch circuit; and the stop established state is set or released in the latch circuit by cutting off or passing the reference current and controlling switching of the three-terminal switch.

8. The switch drive circuit according to claim 7, wherein the high-side switch control circuit is configured to turn on the three-terminal switch, to fix a potential at the input end of the latch circuit at a determined potential, and to set the stop established state, by cutting off the reference current and making a potential at the second input end of the three-terminal switch equal to the second potential of the high-side power supply section, and the high-side switch control circuit is configured to turn off the three-terminal switch and release the stop established state, by passing the reference current and making the potential at the second input end of the three-terminal switch a potential calculated by multiplying the reference current and a resistance value of the resistor together.

9. The switch drive circuit according to claim 7, wherein the high-side switch control circuit further includes a current control switch for performing switching between passing and cutting off the reference current outputted from the constant-current source.

10. The switch drive circuit according to claim 9, wherein:

the constant-current source is a current mirror circuit including a first PMOS transistor and a second PMOS transistor, the three-terminal switch is a third PMOS transistor, and the current control switch is an NMOS transistor;

the first potential side of the high-side power supply section is connected to sources of the first PMOS transistor, the second PMOS transistor, and the third PMOS transistor;

a gate of the first PMOS transistor is connected to a drain of the first PMOS transistor, a gate of the second PMOS transistor, and a drain of the NMOS transistor; and a drain of the second PMOS transistor is connected to a gate of the third PMOS transistor and the other end of the resistor and a drain of the third PMOS transistor is connected to the input end of the latch circuit.

11. The switch drive circuit according to claim 10, wherein:

the latch circuit includes a first inverter, a second inverter, a third inverter, a first resistor, and a second resistor;

an input end of the first inverter is an input end of the latch circuit and is connected to the drain of the third PMOS transistor and one end of the first resistor;

an output end of the first inverter is connected to one end of the second resistor and another end of the second resistor is connected to an input end of the second inverter; and another end of the first resistor is connected to an output end of the second inverter and an input end of the third inverter, and an output end of the third inverter is an output end of the latch circuit and is connected to an input end of the high-side driver.

12. The switch drive circuit according to claim 10, wherein:

a designation signal for controlling passing or cutting off the reference current is inputted to a gate of the NMOS transistor which is the current control switch; and a sink current source for drawing in the reference current is connected to a source of the NMOS transistor.

13. A switch circuit, comprising:

a high-side switch configured to receive first current from a high-side power supply and output the first current to a load;

a low-side switch configured to receive second current from a low-side power supply and output the second current to the load; and a switch drive circuit, comprising:

a latch circuit configured to latch a logic level of a high-side switching control signal at a switching activation time, at which the high-side switch is activated to perform a switching operation;

a low-side driver configured to drive the low-side switch with the second current based on a low-side switching signal; and a high-side switch control circuit configured to output the high-side switching control signal, such that the high-side switching signal is set to be a switching-stop logical state at a switching-stop time, and to be a switching-activation logical state at the switching activation time, wherein the high-side switch control circuit comprises:

a constant-current source configured to generate a reference current; and a three-terminal switch having a first terminal connected to a first terminal of the constant current source and a first terminal of the high-side power supply, having a second terminal connected to a second terminal of the constant current source and connected to output terminals of each of the high-side-switch and the low-side switch via at least one resistor, and having a third terminal connected to the latch circuit to supply the high-side switching control signal to the latch circuit.

* * * * *